United States Patent [19]

Shiber

[11] 4,172,377

[45] Oct. 30, 1979

[54] ADVANCING ASSEMBLY FOR A HIGH SPEED PRESS

[76] Inventor: Samuel Shiber, 1415 E. Cantebury La., Mundelein, Ill. 60060

[21] Appl. No.: 829,865

[22] Filed: Sep. 1, 1977

[51] Int. Cl.[2] ...................... B21D 43/02; F16D 49/02; F16D 63/00

[52] U.S. Cl. ........................................ 72/421; 10/169; 188/82.6; 72/425

[58] Field of Search ................. 72/419, 421, 346, 425; 10/169; 188/82.6

[56] References Cited

U.S. PATENT DOCUMENTS

| | | | |
|---|---|---|---|
| 60,509 | 12/1866 | Hanley | 188/82.6 X |
| 1,847,867 | 3/1932 | Dodge | 188/82.6 X |
| 2,374,464 | 4/1945 | Skriba et al. | 72/421 |
| 2,382,041 | 8/1945 | Ernst | 72/421 |
| 2,515,508 | 7/1950 | Gotberg et al. | 72/346 |
| 2,942,643 | 6/1960 | Pucci et al. | 72/419 X |
| 4,015,301 | 4/1977 | Lee | 10/169 X |

*Primary Examiner*—Francis S. Husar
*Assistant Examiner*—D. M. Gurley
*Attorney, Agent, or Firm*—Mason, Kolehmainen, Rathburn & Wyss

[57] ABSTRACT

A high speed press for coining workpieces includes a head actuable by high pressure fluid. The high speed press also includes an advancing assembly for advancing individual workpieces to a position adjacent the head to be coined. The advancing assembly includes a reciprocating apparatus for advancing the individual workpieces to a position to be coined by the head. The advancing assembly is in fluid communication with the pressurized fluid employed to operate the head such that the operation of the advancing mechanism is synchronized with the operation of the head.

1 Claim, 5 Drawing Figures

ADVANCING ASSEMBLY FOR A HIGH SPEED PRESS

BACKGROUND OF THE INVENTION

A. Field of the Invention

The present invention relates to a new and improved device for advancing workpieces to a work station that is adjacent to a coining head in a high speed press.

B. Description of the Prior Art

High speed presses are often employed to coin metal workpieces. To attain the high press speeds desirable, the workpieces must be rapidly advanced to a work station whereupon the coining operation is performed. Prior art presses employ a dial to advance the workpieces. The dial is rotated in incremental steps and includes apertures on its periphery for holding a workpiece such that upon incremental rotation of the dial, workpieces are sequentially positioned at the work station of the press.

Several different prior art devices are employed to rotate the dial. One prior art device is an electrical mechanism separate from the press that rotates the dial in a programmed sequence.

Another prior art device is a pneumatic mechanism controlled by a separate pneumatic assembly that is programmed for a predetermined advancement cycle.

These prior art devices present several disadvantages. One is that each of these prior art devices requires the employment of energy or actuating fluid separate from that employed in the press. Consequently, completely different mechanisms separate from the press are necessary increasing the complexity and cost of the press.

Another disadvantage of a separate unit controlling the incremental advancement of the dial is that the separate mechanism must be programmed to advance the dial in a predetermined fashion. If the press stops or malfunctions, the advancing mechanism may continue to operate as programmed resulting in damage to the press. In addition, if the press is operating in the normal fashion but the advancing mechanism malfunctions, damage may occur.

A further disadvantage of the prior art advancing mechanisms is that the speed at which they may cycle is limited by the mechanical restraints of the mechanism and the structure connecting it to the press thus preventing operation at the high speeds desired.

SUMMARY OF THE INVENTION

An object of the present invention is to provide a new and improved high speed press for coining workpieces.

Another object of the present invention is to provide a new and improved advancing assembly for advancing individual workpieces to a work station in a high speed coining press.

A further object of the present invention is to provide a new and improved advancing assembly for advancing individual workpieces to a work station in a high speed press that is synchronized with the operation of the head in the press and may be operated at high speeds.

Briefly, the present invention is directed to a new and improved advancing assembly for advancing individual workpieces to a work station adjacent a head of a high speed press. The advancing mechanism includes a reciprocating piston that is coupled by a clutch mechanism to a dial.

The dial includes apertures or similar structure around its periphery to hold individual workpieces such that upon incremental rotation of the dial, individual workpieces are sequentially rotated to a work station where the coining operation by the head is performed. The head is actuated by pressurized fluid and the advancing assembly is coupled to this fluid and also actuated by this fluid such that upon actuation of the head, the mechanism is operated to cock the dial in preparation for subsequent rotation. Upon the pressurized fluid being vented to allow upward movement of the head from the work station, the advancing mechanism also returns to its original position thereby rotating the dial to advance another workpiece to the work station.

A cable brake is also included and secured to the dial to prevent the dial from rotating beyond the desired position due to high speed operation of the advancing mechanism, as well as for preventing the dial from rotating backwards during the cocking action.

BRIEF DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF A PREFERRED EMBODIMENT

Figure 1:
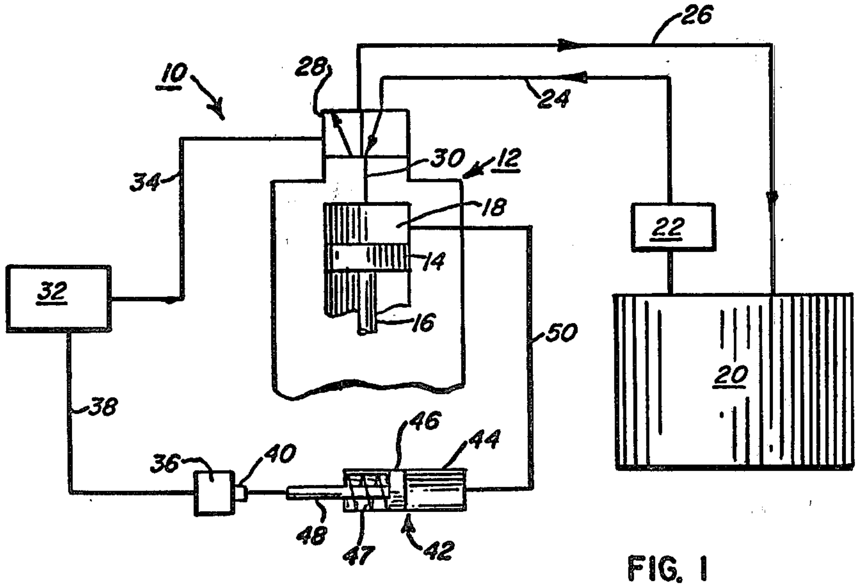
FIG. 1 is a schematic illustration of a high speed press that may be employed for coining workpieces including an advancing mechanism constructed in accordance with the principles of the present invention.

Having reference now to the drawings and initially to FIG. 1, there is illustrated a hydraulic circuit generally designated by the reference numeral 10 that is employed with a high speed press generally designated by the reference numeral 12. The press 12 is employed to coin small articles or workpieces.

The high speed press 12 includes a piston or head generally designated by the reference numeral 14 and a punch 16 attached thereto. The piston 14 is mounted within a piston chamber 18 for reciprocal movement to perform the coining operation.

Reciprocation of the piston 14 within the chamber 18 is accomplished by hydraulic fluid stored in a tank 20 and pumped from the tank 20 to the cylinder 18 by a pump 22. More specifically, fluid within the tank 20 is pumped from the tank 20 through a conduit 24 to the cylinder 18 above the piston head 14. The introduction of high pressure fluid above the piston 14 causes a downward movement of the piston 14 and engagement of the punch 16 with the workpiece.

At the completion of the stroke of the piston 14 and the coining operation, the hydraulic fluid above the piston 14 is vented by a conduit 26 to the tank 20. The piston 14 is then raised to its initial position under the influence of compressed air that is contained within the chamber 18 below the piston 14.

Control of the hydraulic fluid through the lines 24 and 26 to the cylinder 18 is accomplished by an electric solenoid valve 28. In the first position of the solenoid valve 28 illustrated in FIG. 1, fluid flows through the line 30 to the chamber 18. In a second position of the solenoid valve 28, fluid is vented from the chamber 18 by way of conduit 30 through the solenoid valve 28 and the conduit 26 to the tank 20 allowing return of the piston 14 to its original position under the influence of the compressed air.

Actuation of the solenoid valve 28 is accomplished by a timer 32 that is electrically connected by a line 34 to the solenoid valve 28. The timer 32 is of a type well known in the art. Upon actuation of the timer 32, it maintains the solenoid valve 28 in its first position for a predetermined amount of time and then actuates the solenoid valve 28 to its second position.

Energization of the timer 32 is accomplished by a micro-switch 36 that is electrically coupled to the timer 32 by a line 38. The micro-switch 36 includes a plunger 40 that is engaged by the advancing mechanism generally designated by the reference numeral 42. The advancing mechanism 42 is employed to advance individual workpieces to a work station positioned beneath the punch 16 such that a coining operation may be performed. At the completion of the coining operation and during the raising of the punch 16, the advancing mechanism 42 advances another workpiece to the work station moving the previously coined workpiece to a position to be removed from the press and packaged for shipping.

The advancing mechanism 42 includes a cylinder 44 within which a piston 46 is reciprocally mounted. The piston 46 includes a piston rod 48 that engages the plunger 40 of the micro-switch 36 during a predetermined portion of the cycle of the advancing mechanism 42.

To actuate the micro-switch 36 and thus cycle the press 12, it is important that the operation of the advancing assembly 42 is synchronized with the operation of the high speed press 12. Moreover, this must occur at a high speed to be compatible with the operation of the press 12. In order to synchronize the operation of the advancing mechanism 42 with the operation of the high speed press 12, the cylinder 44 is in fluid communication with the portion of the chamber 18 above the piston 14 by a conduit 50. In this manner, as pressurized hydraulic fluid is introduced into the chamber 18 by the solenoid valve 28, the pressurized fluid is also communicated to the cylinder 44 causing extension of the rod 48. This actuation of the advancing assembly 42 corresponds to a cocking portion of a complete cycle of the advancing mechanism 42.

Upon venting the chamber 18 of hydraulic pressure at the completion of the stroke of the punch 16, the cylinder 44 is also vented and the piston 46 is returned under the influence of a spring 47 or other device to its normal initial position. This portion of the cycle of the advancing mechanism 42 is the workpiece advancing portion.

More specifically, during the return of the piston 46, the coined workpiece is advanced from the work station and a new workpiece is advanced to the work station in preparation for the next stroke or cycle of the high speed press 12.

Figure 2:
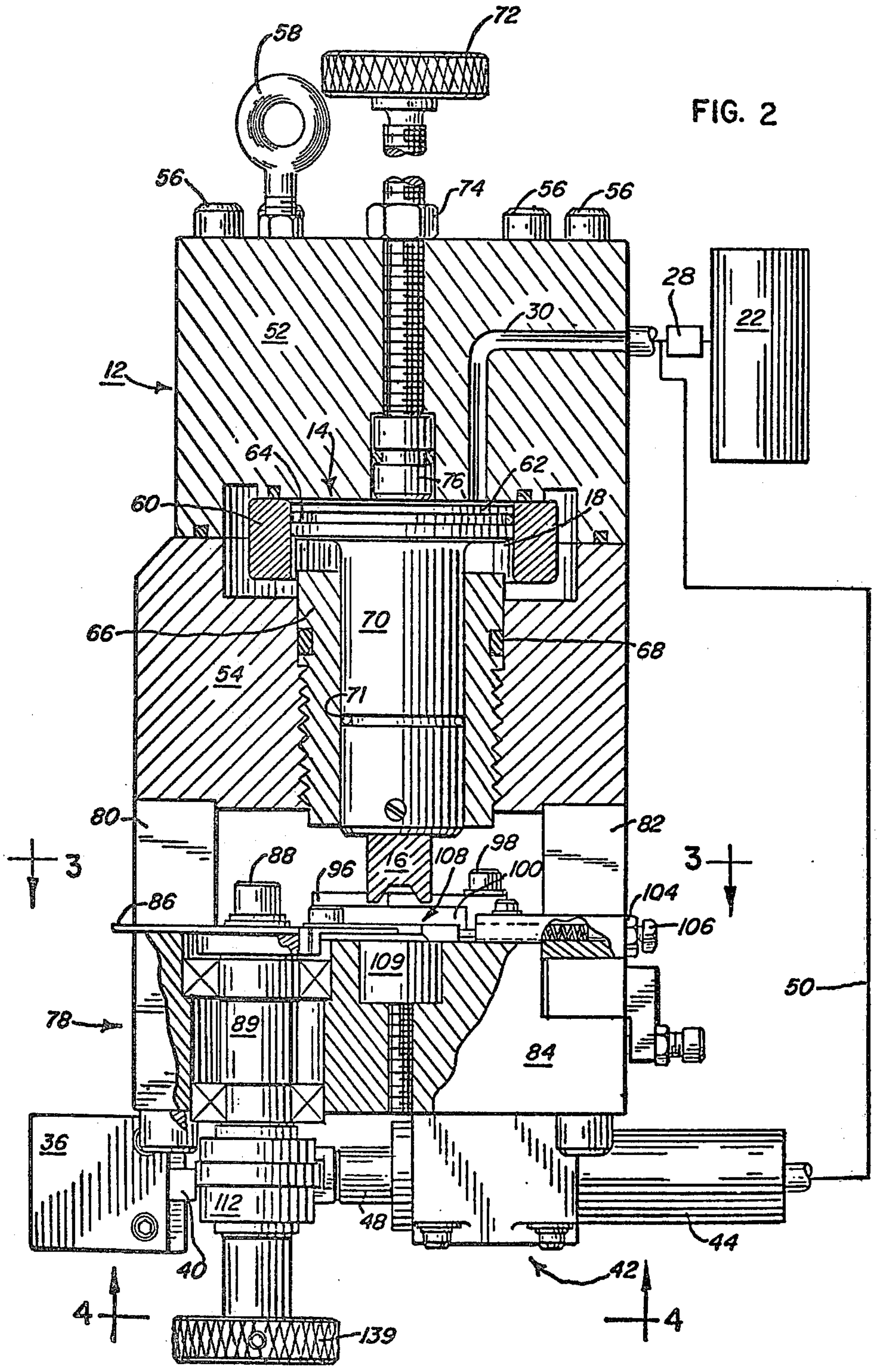
FIG. 2 is a partially cross-sectional view of the high speed press and the advancing mechanism.

Turning now to FIG. 2 the high speed press 12 is illustrated with the pump 22 schematically diagrammed. The solenoid valve 28 and the timer 32 are not illustrated for ease of description. As illustrated in FIG. 2, the high speed press 12 includes a head assembly 52 secured to a base block 54 by a plurality of bolts of fasteners 56. An eye-bolt 58 is secured to the top of the head assembly 52 to allow securement of a lifting device or similar attachment, if necessary.

The head assembly 52 and the base block 54 have defined therein the chamber 18 in which the piston 14 is mounted. A first cylindrical sleeve 60 is secured within the chamber 18 around the head 62 of the piston 14 to define the fluid tight cylinder within which the piston 14 reciprocates. The interface between the sleeve 60 and the piston head 62 is sealed by an O-ring 64.

A second sleeve 66 is also secured within the chamber 18 and extends through the base block 54. The sleeve 66 is sealed within the base block 54 by an O-ring 68. The rod 70 of the piston 14 reciprocates within the sleeve 66 and is sealed by an O-ring 71. The lower end of the rod 70 extends outside of the base block 54 and has the punch 16 connected to the end.

The stroke of the piston 14 within the chamber 18 is defined by an adjusting screw 72 at the upper end of the chamber 18 and the upper surface of the sleeve 66. The lowest point of the stroke of the piston 14 is defined by the engagement of the piston head 62 with the upper surface of the sleeve 66. The upward extent of the stroke may be adjusted by threading the adjusting screw 72 within the nut 74 and the downward extent of the stroke may be adjusted by screwing the sleeve 66 in or out of a mating thread formed in the block 54. The head 76 of the adjusting screw 72 is positioned relative to the upper surface of the piston head 62 thereby defining the upward distance from the upper surface of the sleeve 66 of the piston 14.

That portion of the chamber 18 below the piston head 62, is pressurized by air and provides the force necessary to return the piston 14 after the completion of a coining stroke. That portion of the chamber 18 within the sleeve 60 and above the piston head 62 is in fluid communication through the conduit 30 defined within the head assembly 52 with the pump 22. As previously described, upon introduction of hydraulic fluid to the conduit 30, pressurized fluid is introduced above the piston head 62 in the chamber 18 causing downward movement of the piston 14 and causing the punch 16 to coin the workpiece. Thereafter, the pressurized fluid within the chamber 18 above the piston head 62 is vented through the conduit 30 and the piston 14 is returned to the position illustrated in FIG. 1 under the influence of the pressurized air.

Workpieces are individually moved to a work station beneath the punch 16 by a bolster assembly generally designated by the reference numeral 78 (FIG. 2). The bolster assembly 78 is secured to the base block 54 by plates 80 and 82 and are spaced a distance from the base block 54 sufficient to allow reciprocal movement of the punch 16.

Figure 3:
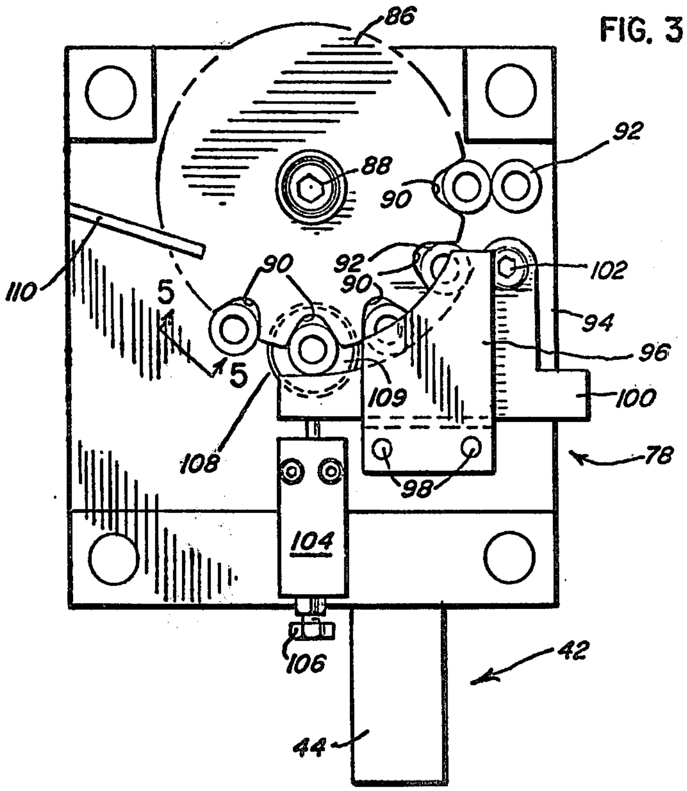
FIG. 3 is a view taken along line 3—3 of FIG. 2.

The bolster assembly 78 includes a body portion 84 that is attached by the plates 80 and 82 to the base block 54. Rotatably mounted on the upper surface of the bolster plate 84 is a dial 86. The dial 86 is connected by a pin or bolt 88 to a dial shaft 89 extending through the body 84. The dial 86 is circular in configuration and includes slots 90 defined in the outer periphery that are adapted to engage and hold an individual workpiece such as workpiece 92 (FIG. 3).

The bolster assembly 78 also includes an upper plate or surface 94 that serves as a table or similar surface on which the individual workpieces 92 are fed into an empty slot 90 as the dial 86 is rotated. A workpiece guide 96 is rigidly secured to the surface 94 by bolts 98. Also secured to the surface 94 and beneath the workpiece guide 96 is a workpiece follower 100. The workpiece follower 100 is pivotally secured to the table 94 by a pivot pin 102 and is biased toward the dial 86 by a tension assembly 104 whose tension may be adjusted by a screw 106.

As the dial 86 is rotated, the follower 100 serves to position the workpieces 92 firmly within the slots 90 such that once the workpiece is at the work station 108, the workpiece 92 is firmly held within the slot 90 to assure accurate positioning thereof during the coining operation. It should be clear that the work station 108 is positioned directly beneath the punch 16 and includes a surface defined by a wear disc 109 positioned within the bolster block 78.

Ordinarily the high speed press 12 and the holster assembly 78 are inclined so that the workpiece 92 enters the dial 86 at a high point and tends to exit the slot 90 after exiting the work station; however, a bracket 110 assures that the workpiece will not remain stuck in the dial 86.

In order to obtain proper operation and to avoid damage to the press 12, the dial 86 is advanced or rotated in synchronism with the operation of the punch 16 by the advancing mechanism 42. As previously described, the advancing mechanism 42 includes the cylinder 44 within which the piston 46 is mounted. The piston rod 48 is reciprocated by the piston 46 and is mechanically coupled to a one-way clutch assembly 112 (FIGS. 2 and 4) that is secured to the dial rod 89. The rod 48 is coupled to a flange 116 defined on the clutch 112 by a pivot bolt 114. The one-way clutch 112 further includes a second flange 118 that is adapted to engage the plunger 40 of the micro-switch 36.

Figure 4:
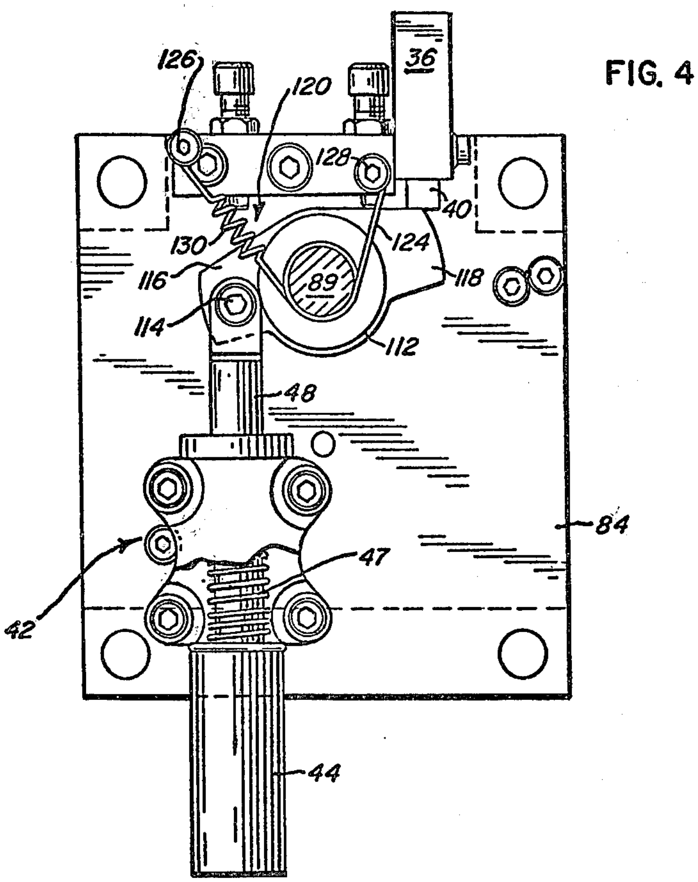
FIG. 4 is a view taken along line 4—4 of FIG. 2.
Figure 5:
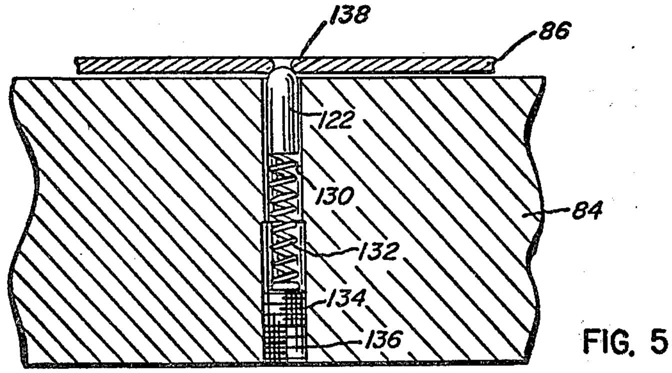
FIG. 5 is a partially fragmented view taken along line 5—5 of FIG. 3.

At the commencement of a coining operation, the advancing assembly 42 is in the position illustrated in FIG. 4 with the flange 118 of the one-way clutch 112 engaging and depressing the plunger 40 of the micro-switch 36. Upon actuation of the piston 14 of the high speed press 12 by the introduction of fluid in chamber 18, the rod 48 of the advancing mechanism 42 is extended causing rotation of the clutch 112 about the dial rod 89. This movement rotates the flange 118 away from the plunger 40 allowing extension of the plunger 40 energizing the micro-switch 36. Due to the one-way action of the clutch 112, the dial rod 89 is not rotated during this portion of the cycle and is termed the "cocking" of the advancing mechanism 42.

As previously described, energization of the micro-switch 36 energizes the timer 32 which in turn controls the actuation of the solenoid valve 28. After a preselected period of time, the solenoid valve is actuated venting the chamber 18 and allowing the return of the piston 14 completing the coining operation. As this occurs, rod 48 of the advancing mechanism 42 is withdrawn within the cylinder 44 causing rotation of the one-way clutch 12 to the position illustrated in FIG. 4. During this portion of this cycle, the clutch 112 engages the dial rod 89 causing a rotation of the rod 89 and the dial 86 causing advancement of the workpieces 92. At the completion of this rotation, the plunger 40 is again depressed causing a de-energization of the micro-switch 36 initiating the next cycle.

Since the press 12 operates at high speeds resulting in rapid extension and withdrawal of the rod 48 of the advancing mechanism 42, there is a tendency due to the high inertial forces developed by the dial 86 and the dial rod 89 for the dial 86 to advance the next uncoined workpiece 92 beyond the work station 108. This could result in possible damage to the dial 86 and the punch 16 during the next coining operation. To prevent this undesirable overadvancement of the dial 86, a cable brake generally designated by the reference numeral 120 and a locator plunger designated by the reference numeral 122 are employed. The cable brake 120 includes a cable 124 that is secured at a first end to a fastener or bolt 126 that is secured to the press 12 and a second end secured to a second bolt 128 that is also secured to the press 12 (FIG. 4). The cable 124 is wrapped around the dial shaft 89 a predetermined number of turns and includes a small spring 130 between the dial shaft 89 and the end of the cable 124 secured to the bolt 126. Through the use of the brake 120, a smaller force is developed between the bolt 126 and the shaft 89 than the force developed between the bolt 128 and the shaft 89 and the force between the bolt 126 and the shaft 89 is substantially independent of friction.

The larger force is developed by the cable brake 120 in a direction to prevent rotation of the dial shaft 89 in a negative advancement direction. More specifically, the cable brake 120 applies a substantial force to the shaft 89 to prevent counter-clockwise rotation of the dial 86 as viewed in FIG. 3. This substantial force is necessary to counter the inherent friction of the one-way clutch mechanism and its seals which may increase due to dirt and debris trapped in or around it which would tend to produce a negative advancement of the dial 86. Accordingly, the substantial force imparted to the shaft 89 in this direction by the cable brake 120 prevents this negative rotation of the shaft 89.

The cable brake 120 also develops a smaller force on the dial shaft 89 in the direction opposite to the larger force. This smaller force applied to the dial shaft 89 in the positive advancement direction or the clockwise direction of the dial 86 as viewed in FIG. 3, is sufficient to prevent overadvancement of the dial 86 beyond the work position 108 that may occur due to the inertial forces developed by the dial 86 and the shaft 89 as a result of the high speed retraction of the rod 48.

As a further prevention against overadvancement of the dial 86 the locator plunger 122 is included. The locator plunger 122 is mounted within a bore 130 defined in the bolster plate 84. The plunger 122 is biased upward and into engagement with the dial 86 by a spring 132 also mounted within the bore 130. The tension of the spring 132 may be varied by a set screw 134 threaded into a threaded portion 136 of the bore 132. The dial 86, in addition to the slots 90, includes depressions or small holes 138 fabricated in the dial 86 and the approximate size of the end of the plunger 122. Accordingly, during advancement of the dial 86, the plunger 122 will engage a specific depression 138 at the completion of the proper advancement of the dial 86 thus preventing overadvancement of the dial 86 beyond the work station 108.

A mechanism to position the dial 86 in the correct position prior to commencement of the operation of the press 12 is provided by the dial adjusting knob 139. The adjusting knob 139 is connected to the dial rod 89 and allows manual rotation of the dial 86 to position a selected slot 90 at the work station 108.

To further understand the press 12 and the advancing mechanism 42, their operation is explained. Upon commencement of a coining operation, the micro-switch 36 and the rod 48 of the advancing mechanism 42 are in the positions illustrated in FIG. 4 such that the flange 118 depresses the plunger 40 of the micro-switch 36. This causes energization of the timer 32 moving the solenoid valve 28 to the position illustrated in FIG. 1 such that the pump 22 supplies pressurized fluid by way of the conduits 24 and 30 to the cylinder 18. The introduction of pressurized fluid causes a downward movement of the piston 14 within the press 12. At the same time, by way of the conduit 50, pressurized fluid is introduced to the cylinder 44 of the advancing mechanism 42 causing an extension of the rod 48.

The extension of the rod 48 causes rotation of the one-way clutch 112 which may rotate around the dial shaft 89 although not advancing the dial 86 due to the one-way action of the clutch 112 and the influence of the cable brake 120. Upon coining engagement of the punch 16, the preselected time on the timer 32 has elapsed and the solenoid valve 28 is shifting to a position to vent the pressurized fluid from the cylinder 18. Once the pressure above the piston head 62 is vented by this operation, the pressurized air below the piston head 62 results in an upward movement of the piston 14 withdrawing the punch 16 from the coined workpiece 92.

As this venting occurs, the pressurized fluid within the cylinder 44 of the advancing mechanism 42 is also vented and the piston 46 is returned to its initial position by the spring 47. This causes a withdrawal of the rod 48 and a rotation of the one-way clutch 112 causing an advancement of the dial 86. This advancement of the dial 86 positions an uncoined workpiece 92 at the work station 108. The advancing rotation of the dial 86 is arrested by the cable brake 120 to prevent overadvancement of the uncoined workpiece 92 beyond the work station 108. In addition, the plunger 122 engages an advancing hole or depression 138 also serving to prevent overadvancement. Upon complete withdrawal of the rod 48, the flange 118 again engages the plunger 40 of the micro-switch 36 and the cycle may then be repeated.

Any modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. In combination, a high speed press for coining workpieces including a head reciprocated by high pressure fluid for coining said workpieces, and an advancing assembly for sequentially advancing individual workpieces to a work station adjacent said head to be coined thereby, said advancing assembly comprising:

a dial rotatably mounted on said press, said dial including means for containing individual workpieces at spaced locations thereon;

means for incrementally advancing said dial to position uncoined workpieces at said work station;

said advancing means being in direct fluid communication with said head and actuated in synchronism with said head by said fluid and including a cylinder, a piston rod and a piston, spring means in said cylinder on a first side of said piston for biasing said piston rod to a first position, said cylinder being in direct fluid communication on a second side of said piston with said head, switch means actuated by said piston rod for controlling the flow of pressurized fluid to said head and said second side of said cylinder, said piston moved against said spring to a second position upon introduction said fluid by said switch means, clutch means for coupling the rod of said piston to said dial such that on the extension stroke of the rod upon introduction of said fluid in said second side of said cylinder said clutch means is cocked and on the return stroke of said rod said clutch means is engaged to advance said dial, brake means for preventing rotation of said dial during the extension stroke of said rod and allowing arrested rotation of said dial during said return stroke, said brake means includes a brake cable encircling said dial and having first and second ends secured to said press, said brake means further includes a spring secured to said cable between said press and said first end, and a locator plunger defined on said press in releasable holding engagement with said dial, said locator plunger and said brake means cooperate to prevent overadvancement of said dial wherein said brake cable of said brake means applies a braking torque on said dial in one direction which is independent of friction.

* * * * *